United States Patent [19]

Bottorf

[11] Patent Number: 5,267,062
[45] Date of Patent: Nov. 30, 1993

[54] SYSTEM FOR BACKLIGHTING LCD MATRICES INCLUDING LUMINESCENT DOTS EACH FOLLOWED BY AND AT THE FOCAL POINT OF A LENS

[75] Inventor: Scott A. Bottorf, Cedar Rapids, Iowa

[73] Assignee: Rockwell International Corporation, Seal Beach, Calif.

[21] Appl. No.: 750,145

[22] Filed: Aug. 26, 1991

[51] Int. Cl.$^5$ .............................................. G02F 1/1335
[52] U.S. Cl. ........................................ 359/40; 359/49; 359/50
[58] Field of Search ...................... 359/40, 41, 50, 49

[56] References Cited

U.S. PATENT DOCUMENTS

| | | | |
|---|---|---|---|
| 4,330,813 | 5/1992 | Deutsch | 359/40 |
| 4,686,519 | 8/1987 | Yoshida et al. | 359/40 |
| 4,790,632 | 12/1988 | Miyakawa et al. | 359/49 |
| 4,799,050 | 1/1989 | Prince et al. | 359/49 |
| 4,917,464 | 4/1990 | Conner | 359/41 |
| 5,019,808 | 5/1991 | Prince et al. | 359/68 |
| 5,128,783 | 7/1992 | Abileah et al. | 359/40 |

FOREIGN PATENT DOCUMENTS 0267686  5/1988  European Pat. Off. ............. 359/50

*Primary Examiner*—William L. Sikes
*Assistant Examiner*—Anita Pellman Gross
*Attorney, Agent, or Firm*—John J. Horn; Gregory G. Williams; H. Fredrick Hamann

[57] ABSTRACT

A backlighting system for use in generating collimated light for illuminating LCD matrices. The system includes a plurality of lenses arranged in an array on one side of a planar substrate, a plurality of luminescent phosphor dots located on the opposite side of the substrate from the lenses at the focal points of the lens and a mechanism for stimulating the phosphor dots to emit light. The phosphor dots may be responsive to ultraviolet light in which case a fluorescent lamp adapted for emitting ultraviolet light may be used to stimulate the dots to emit visible light. The visible light is then collimated by the lenses and directed for backlighting a display matrix.

7 Claims, 2 Drawing Sheets

LENS ARRAY

MICROCHANNEL PLATE

FILAMENT

SYSTEM FOR BACKLIGHTING LCD MATRICES INCLUDING LUMINESCENT DOTS EACH FOLLOWED BY AND AT THE FOCAL POINT OF A LENS

BACKGROUND OF THE INVENTION

The present invention relates to liquid crystal displays and more particularly to systems for backlighting liquid crystal display matrices with collimated light.

Proper backlighting is essential to assure good performance of projection type liquid crystal display (LCD) matrices. The light provided by an LCD backlighting system should be orthogonal to the plane of the LCD matrix in order to maximize the efficiency of the crystals in modulating the light to form images. Furthermore, in many applications such as aircraft instrumentation backlighting systems must be as compact as possible since the available space is very limited.

It is therefore an object of the present invention to provide a backlighting system for use in conjunction with LCD matrices which generates collimated light and has a compact size capable of fitting along the backside of the LCD matrix.

It is another object of the present invention to provide a backlighting system for use in conjunction with LCD matrices which is as planar as possible having a very limited depth as compared to its width and height.

It is a further object of the present invention to provide a backlighting system for use in conjunction with LCD matrices which supplies light having a uniform intensity distribution across the matrix.

SUMMARY OF THE INVENTION

The present invention constitutes an apparatus for backlighting an LCD matrix with collimated light which includes a plurality of plano-convex lenses, a plurality of luminescent phosphor dots and a mechanism for stimulating the dots to emit visible light. The plano-convex lenses are arranged into a two dimensional array on one side of a planar substrate while the phosphor dots are positioned on the opposite side of the substrate at the focal points of the lenses in a corresponding array in which one phosphor dot is provided for each lens. The phosphor dots preferential comprise a photoluminescent material which can be stimulated by ultraviolet light which can be provided by a fluorescent lamp.

In operation, ultraviolet light stimulates the phosphor dots to emit visible light a substantial amount of which is directed toward the lenses. Since the dots are in proximity to the focal points of the lenses the lenses act to collimate the light in a direction orthogonal to the plane of the substrate on which the lenses are mounted. In the preferred embodiment, the lenses comprise plano-convex lenses which are constructed so as to be internally integrated with the planar substrate whereby the lenses array can be readily manufactured.

DESCRIPTION OF THE PREFERRED EMBODIMENT

Figure 1:
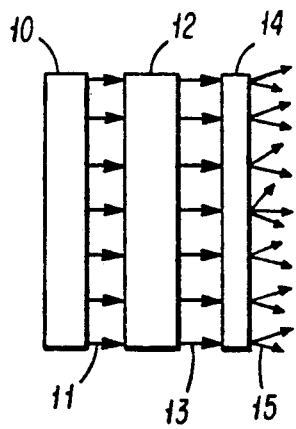
FIG. 1 provides a diagramatic illustration of the use of the present invention in conjunction with an LCD matrix and a light diffuser.

Referring now to FIG. 1, the present invention provides an apparatus 10 for backlighting an LCD matrix 12 made up of a multiplicity of LCD pixels which may be individually controlled to form images. The backlighting apparatus 10 projects collimated light 11 onto the backside of the matrix 12 which falls on the rear surface of the matrix 12 at right angles (i.e. orthogonally) to the plane defined by the matrix. The light 13 which passes through the matrix 12 is intercepted by a diffuser 14 in close proximity to the front side of the matrix 12. The diffuser 14 diffuses the light 13 from the matrix 12 in order to enhance the viewing of images formed on the matrix 12 at off-axis or oblique angles since the light 15 emitted by the diffuser 18 is no longer collimated.

Figure 2A:
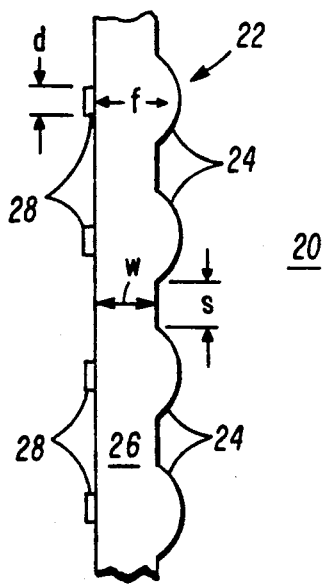
FIGS. 2A and 2B provide cross sectional and plan views of the light collimation component of the present invention including a lens array and corresponding phosphor dot array constructed on a planar substrate.
Figure 2B:
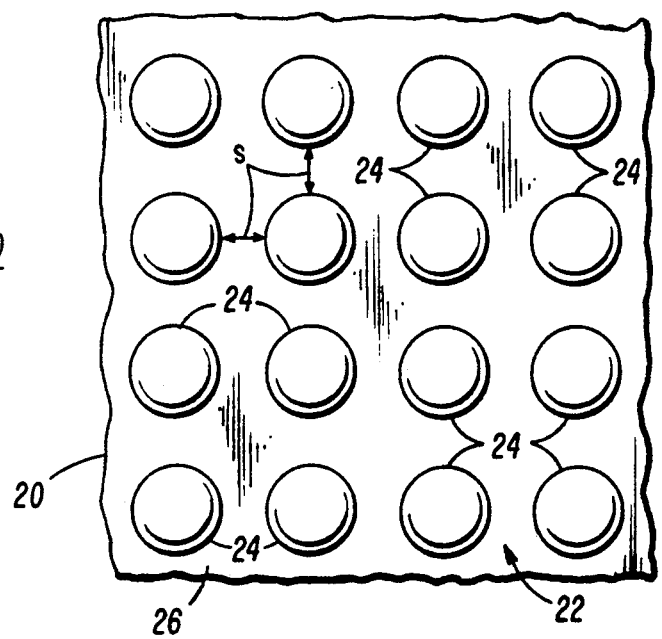

Referring now to FIGS. 2A and 2B, the light collimating component 22 of the present invention is shown as including a large number of separate lenses 24 which are arranged on the front side of a substrate 26 in a two dimensional array so as to be equal spaced apart by a distance s which should be as small as possible consistent with other requirements in order to maximize the light output of the device. The lenses 24 are characterized by a plano-convex structure and are integrally constructed as a part of the planar substrate 26. The plano-convex lens 24 may be formed on the planar substrate 26 by selective exposure of glass which is dimensional sensitive to ultraviolet light. For example, the lenses may be formed in accordance with the techniques used by Corning, Inc. of Corning, N.Y. in the manufacture of Foto-Form ® type lenses. Alternately, the lenses 24 forming the array 22 may be molded out of plastic having suitable light transmissive and refractive characteristics. A set of luminescent phosphor dots 28 are deposited on the back side of the substrate 26 opposite the lenses 24 in proximity to the focal points of the lenses. The phosphor dots 28 form a two dimensional array on the backside of the substrate 26 corresponding on a one-to-one basis to the lenses 24. The dots 28 have a diameter d and are constructed of a phosphor which may be stimulated to emit visible light by ultraviolet radiation in accordance with well known principles. The substrate 26 has a width w which is dimensioned so as to locate the phosphor dots 28 at the focal points of the lenses 24 when the dots are centrally positioned with respect to the optical axes of the lenses 24.

Figure 3:
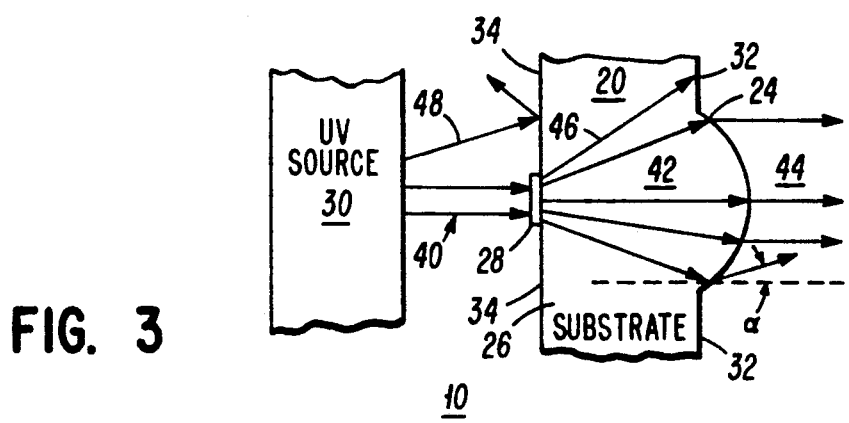
FIG. 3 provides a cross sectional view showing the operation of a single phosphor dot and lens unit of the present invention in response to light from an ultraviolet source.

Referring now to FIG. 3, ultraviolet (UV) light generated by UV source 30 such as a fluorescent lamp is incident upon the phosphor dot 28 and stimulates the emission of visible light 42 from the dot 28 which projects outward in all directions but most importantly in the direction of the lens 24. The light 40 which enters the lens 24 is collimated by the lens in order to generate collimated light 44. The light collimating component 20 should preferably include opaque shielding areas 32 extending between the lens 24 for blocking the emission of off-axis light as illustrated by the light ray 46. The collimation component 20 may also include reflective strips 34 on the rear surface of the substrate 26 for reflecting ultraviolet light which intersects the component 20 in areas between the phosphor dots 28 as illustrated by the light ray 48 back to the UV source 30 where it may be returned to the component 20 in order to improve the efficiency of the UV source 30. The phosphor dots 28 should be sized to have a diameter d in accordance with the angle $\alpha$ by which the light 44 may be allowed to diverge from the normal from the plane defined by the substrate 26 (and the LCD matrix). The diameter d of the phosphor dots may in fact be determined in accordance the following equation:

$$d = 2 f \sin \alpha$$

Where:
 d = diameter phosphor dot
 f = focal length of lenses
 $\alpha$ = divergence angle In a typical application the divergence angle might be expected to be on the order of seven degrees and therefore the diameter of the phosphor dots d may be expected to be approximately 0.24 times the focal length f of the lenses 24.

Figure 4:
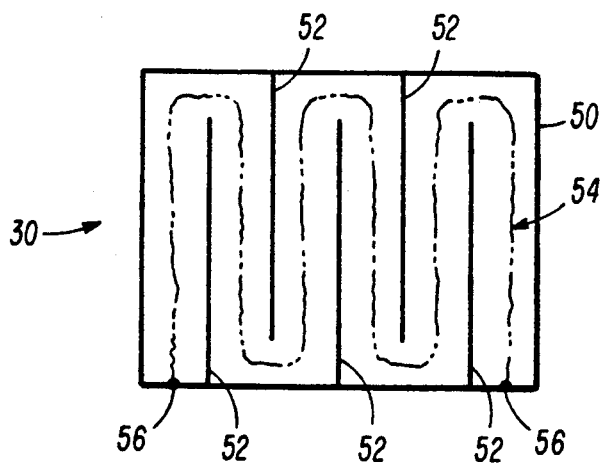
FIG. 4 provides a diagramatic plan view of a special fluorescent lamp which would provide an effective source of ultraviolet light for use in the present invention.

Referring now to FIG. 4, a preferred source 30 of ultraviolet for stimulating the phosphor dots 28 may comprise a fluorescent lamp including a face plate 50 having a special labyrinth like configuration defined by the dividing walls 52 which force the arc of the lamp to follow a serpentine path 54 between the filaments 56. The use of a single fluorescent lamp having a single arc path 54 provides electrical efficiency and simplicity to the UV source 30.

Figure 5:
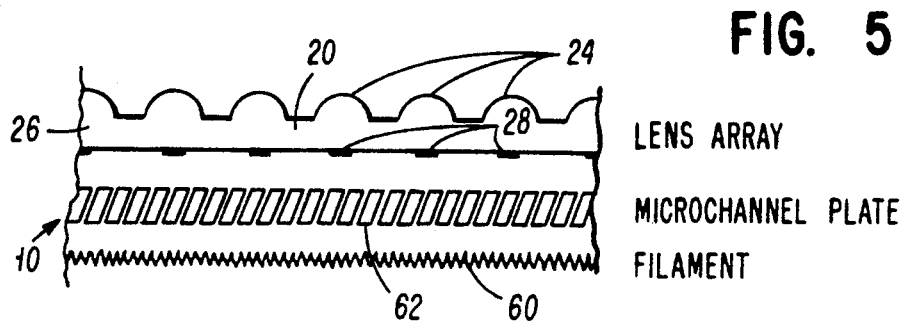
FIG. 5 provides a cross sectional view of an alternate embodiment of the present invention in which the phosphor dots are stimulated to emit light by being bombarded by electrons generated from a filament and multiplied in number by a microchannel plate.

Referring now to FIG. 5, in an alternative embodiment the phosphor dots 28 may be constructed of a cathodoluminescent material responsive to simulation by energized electrons. A filament 60 may be heated and used to generate a supply of electrons which are directed by an electric field toward and into a microchannel plate 62 where they are accelerated down the channels in the plate and generate more electrons as they ricochet off the walls of channels. The microchannel plate 62 generates a copious supply of energized electrons which are projected toward the phosphor dots 28 and which stimulate the phosphor dots to emit visible light which can then in turn be collimated by the lenses 24. The filament 60, microchannel plate 62 and cathodoluminescent phosphor dots 28 provide an alternate technique for generating the light to be collimated by the lenses 24.

Figure 6A:
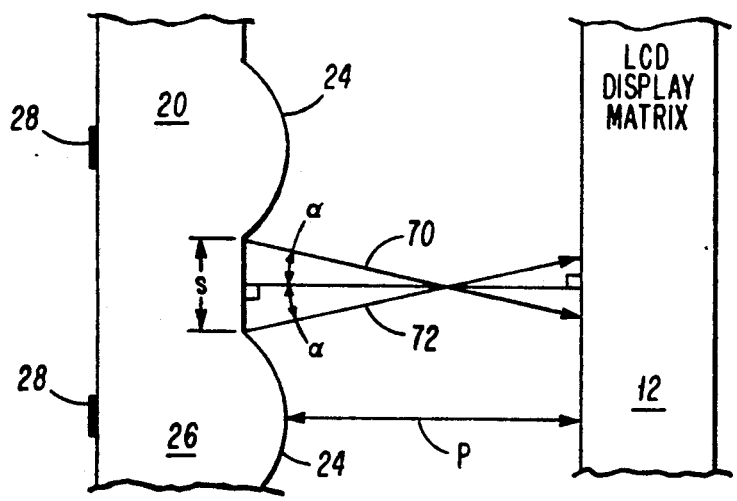
FIGS. 6A and 6B provide a cross sectional view of the lens array of the present invention in conjunction with an LCD matrix and a plan view of the areas illuminated by the lenses on the matrix illustrating the proper determination of the spacing between the lenses in lens array of the present invention.
Figure 6B:
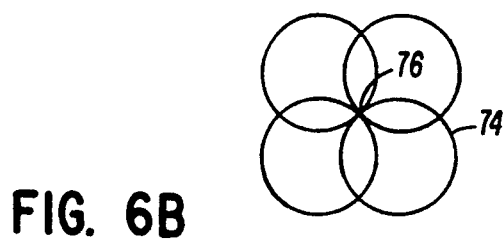

Referring now to FIG. 6A and 6B, the distance p between the lenses 24 and the LCD matrix 12 should be determined so as to allow the light supplied by the individual lenses 24 to overlap as shown in FIG. 6B. The distance p may be determined in accordance with the following equation:

$$p = \frac{\sqrt{2} \, s}{(2 \sin \alpha)}$$

Where:
 p = lens/display distance
 s = lens spacing
 $\alpha$ = divergence angle.

As shown in FIG. 6A, given a pre-determined angle $\alpha$ with the normal to the surface of the light collimating component 20, light rays 70 and 72 from the lenses 24 will overlap given a sufficient distance p. In fact, if the distance p is calculated in accordance with the equation given above the circles of light such as circle 74 supplied by the individual lenses 24 will overlap so that diagonally adjacent lenses will provide circles of light 74 which are approximately tangent to one another at the point 76 where they intersect. In a typical application given a divergence angle of approximately the 7 degrees, the distance p necessary to assure overlap of the circles 74 so that light is provided to every part of the rear surface of the LCD matrix 12 would be approximately 12 times to focal length f of the lenses 24.

While particular embodiments of the present invention have been shown and described, it should be clear that changes and modifications may be made to such embodiments without departing from the true scope and spirit of the invention. It is intended that the appended claims cover all such changes and modifications.

I claim:

1. An apparatus for backlighting an LCD matrix with collimated light, comprising:
  a plurality of plano-convex lenses which are constructed on one side of a planar substrate and which are arranged into a two dimensional array;
  a plurality of luminescent phosphor dots which are constructed on the other side of said planar substrate from said lenses and are arranged into a two dimensional array with a single dot of said plurality of dots at the focal point of each of said plurality of lenses, and,
  means for stimulating said phosphor dots to emit light in the direction of said lenses;
  wherein the distance between said LCD matrix and said lenses is approximately equal to 12 times the spacing between said lenses;
  whereby, each of said plurality of lenses focuses the light from a single dot so as to provide a collimated light beam.

2. An apparatus for backlighting an LCD matrix with collimated light, comprising:
  a planar substrate including a set of lenses arranged into a two dimensional array on one side of said substrate and a set of luminescent phosphor dots positioned at the focal points of said lenses on the opposite side of said substrate; and
  means for stimulating said phosphor dots to emit visible light;
  said visible light eminating from at least two lenses of the set of lenses and at least two dots of said dots overlap, thereby creating a more uniform backlight;
  whereby, said lenses collect, focus and collimate said visible light.

3. The apparatus of claim 2, wherein said phosphor dots are photoluminescent and said means for stimulating said phosphor dots includes a fluorescent lamp adapted for emitting ultraviolet light.

4. The apparatus of claim 2, wherein said lenses comprise plano-convex lenses which are integrally constructed with said substrate.

5. A method of illuminating an LCD matrix including a plurality of LCD pixels, comprising the steps of:
   stimulating a set of luminescent dots which are arranged into a two dimensional array on the back side of a planar substrate;
   collecting, focusing and collimating light emitted by said dots using a set of plano-convex lenses which are arranged into a two dimensional array on the front side of said planar substrate and are positioned so as to place said dots at the focal points of the lenses; and
   projecting the light emitted by said dots and collimated by said lenses onto the liquid crystal pixels in said LCD matrix in order to backlight said matrix, said step of projecting light further including projecting light, so that, light eminating from a first dot of said set of luminescent dots overlaps with light eminating from a second dot of said set of dots.

6. The method of claim 5, further including the step of:
   diffusing the light passed through the pixels in said LCD matrix in order to enhance the quality of the images presented by said matrix at oblique viewing angles, said step of projecting light further including projecting light, so that, light eminating from a first dot of said set of luminescent dots overlaps with light eminating from a third dot of said set of dots.

7. The method of claim 5, wherein said step of stimulating said dots includes the substep of illuminating said dots with ultraviolet light from a fluorescent lamp.

* * * * *